H. G. HOOPER.
AEROPLANE CONSTRUCTION.
APPLICATION FILED SEPT. 13, 1918.

1,351,852.

Patented Sept. 7, 1920.

INVENTOR,
Harris. G. Hooper;

HIS ATTORNEY.

UNITED STATES PATENT OFFICE.

HARRIS G. HOOPER, OF SAN FRANCISCO, CALIFORNIA.

AEROPLANE CONSTRUCTION.

1,351,852.  Specification of Letters Patent.  Patented Sept. 7, 1920.

Original application filed August 28, 1917, Serial No. 188,623. Divided and this application filed September 13, 1918. Serial No. 253,875.

*To all whom it may concern:*

Be it known that I, HARRIS G. HOOPER, a citizen of the United States, residing at San Francisco, in the county of San Francisco and State of California, have invented new and useful Improvements in Aeroplane Construction, of which the following is a specification.

This invention relates to flying machines or heavier-than-air aeronautical vehicles, and more particularly to improvements in aeroplane construction, the primary object being the provision of improvements in aeroplane construction which will be superior in point of relative simplicity and inexpensiveness of construction and organization, taken in connection with, or considered in the light of superiority as to durability, combustibility, structural rigidity, stress resistance, length of life, lightness and compactness in form and facility of assemblage and security of inter-connection and association and inter-relation of parts and features, in addition to general efficiency and serviceability.

This invention is a division of my pending application for patent for flying machines filed by me August 28, 1917, Ser. No. 188,623.

A further and more specific object is to provide an effective, strong and durable means of connection between the wing or sustaining surfaces of an aeroplane, the particular means of connection being constructed, associated and inter-related with the sustaining surfaces in a novel and reliable manner, and being adapted for association with metallic plane or sustaining surfaces and primarily designed for use in connection with such surfaces.

With the above and other objects in view, the invention consists in the novel and useful provision, formation, construction, combination, association and inter-relation and mode of assemblage in connection of parts, members and features, all as disclosed in the accompanying drawing, described in the following specification and finally defined in the claims.

Figure 1:
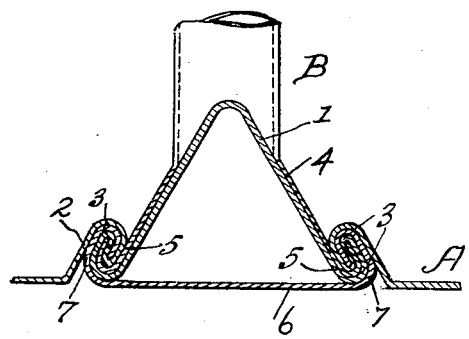
Figure 1 is a detail fragmentary view illustrating the manner of connecting a strut with the wing or sustaining surfaces showing parts in section and one of the sustaining surfaces as being formed of metal sheets.

Referring particularly to the drawing, A designates a fragment of the surface covering of one of the planes of an aeroplane, said plane being formed of sheet-metal, and B designates a hollow preferably sheet-metal strut. This strut is preferably formed of a single sheet of metal developed into proper contours to provide a minimum effective head resistance, the vertical edges $b$ of said sheet being brought together at the rear face of the structure and formed into a suitable lap joint. Other formations resulting in the strut construction may be utilized if so desired, the essential requirement being that the strut be preferably formed of metal and of hollow construction.

The plane surface A is modified in its formation to accommodate and support a seat or step 1 for the strut B, said seat or step being preferably of an inverted V-shape. The plane A is transversely folded as at 2, said folded portions being spaced from one another so as to receive the transversely bent up edges 3 of the seat or step 1. This seat or step 1 is of angular formation as before stated and stands substantially upright on plane A, and may extend as far as desired transversely of the plane A. The strut B is split or expanded at its lower end as at 4, to fit over such seat or step 1 and the lower edges of the strut are bent up as at 5, and returned into the folded formation 2 of the plane A, in association with the bent-up edges 3 of the seat 1. The interfitting and inter-association of the bent-over or folded portions of the seat 1, plane A and strut B provide a rigid, secure and reliable connection between the strut and plane surface. To complete the sustaining or plane surface at the open base of the angularly formed seat 1 a transverse closure and reinforcing section 6 of sheet metal, is fitted in place beneath said seat and provided with bent-up extremities or edges 7 which are received between the bent-up portions 2 and 3 of the plane A and lower edges of the strut B respectively. The plane A and strut B together with the sheet 6 and seat 1 in being thus inter-folded or inter-associated provide a reliable and secure connection thereof, and it will be observed that I may in this manner assemble an aeroplane consisting of metallic planes or sustaining surfaces and metallic struts, the essential features of the particular construction and relative arrangement of particularly constructed parts of the strut and planes being rigidity of connection taken in consideration with ease of assemblage and the stress-resisting qualities provided by the particular construction and inter-relation of the elements of the construction so employed. An aeroplane or like aeronautical vehicle in which the spaced sustaining or plane surfaces are joined by struts in the manner hereinbefore described and illustrated in the accompanying drawing will possess permanent rigidity and strength and not be subject to derangement incident to the stresses and strains to which such parts are subjected in ordinary usage.

Figure 2:
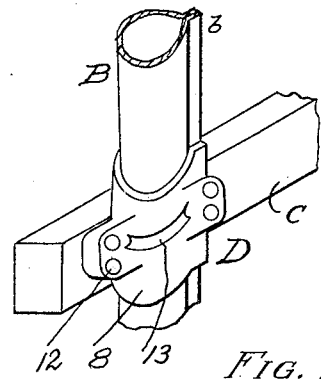
Fig. 2 is a perspective view of the strut shown in Fig. 1 illustrating the manner of connecting such strut with the aeroplane.
Figure 3:
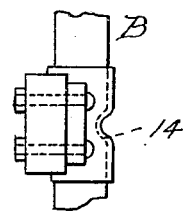
Fig. 3 is a side elevation of the construction illustrated in Fig. 2.
Figure 4:
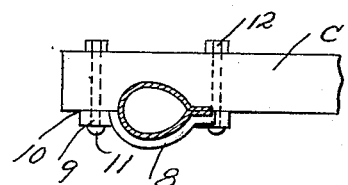
Fig. 4 is a side sectional view taken through the strut showing means for connecting it with the aeroplane and a portion of the aeroplane in top plan.

Referring particularly to Figs. 2, 3 and 4, the strut B is illustrated as rigidly connected with a body C or other structural member of an aeroplane or like aeronautical vehicle, means D being provided for securing or fastening the strut to the body member C. This means D consists preferably and essentially of a metal clamp 8 which is of arcuate formation so as to conform to and snugly engage the strut B. The clamp 8 is provided with extensions or ears 9 which have openings 10 formed therethrough for the reception of bolts or other fastening elements 11, such elements being inserted through the member C and preferably secured in place by nuts 12. As a means for locking the clamp 8 upon the strut B there is provided a rib 13 extending transversely of the clamp and having engagement in a complementary groove 14, the latter being formed in the strut B. The rib 13 is preferably formed by striking the metal of the clamp 8 inwardly along a given line transversely or horizontally of the clamp and the clamp in this inter-fitting or inter-locking with the strut provides for a maximum security and rigidity of connection between the strut B and member C and in this way an aeroplane or like structure will have maximum ridigity and strength and is capable of withstanding severe strain and stresses without derangement of the construction thereof and resultant loosening of elements of the construction.

With reference to the foregoing description and accompanying drawing, it will be seen that I have provided means of connection for the spaced sustaining surfaces, wings or planes of an aeroplane or like aeronautical vehicle including means for connecting such means with the aeroplane body structure, both said means being specially designed and constructed and adapted for use in connection with metallic plane surfaces and metallic struts, the essential features of improvement therein being the particular inter-relation, construction and association of the parts providing for the connection of the struts and plane surfaces, and struts with the body construction of an aeroplane or like aeronautical vehicle.

Having thus disclosed my invention, I claim and desire to secure by Letters Patent:

1. In improvements of the character disclosed, means for producing sustentation of atmospheric re-action comprising spaced upper and lower walls, a strut connected with one of said walls, and means for connecting said strut, comprising an arched plate joined at its edges with said wall by a lap joint and upon which said strut rests.

2. In improvements of the character disclosed, means for producing sustentation of atmospheric re-action comprising spaced upper and lower walls, a strut connected with one of said walls, and means for connecting said strut, comprising an arched plate joined at its edges with said wall by a lap joint; said strut being tubular and split to straddle said plate.

3. In improvements of the character disclosed, means for producing sustentation of atmospheric re-action comprising spaced upper and lower walls, a strut connected with one of said walls, and means for connecting said strut, comprising an arched plate; said strut being tubular and split to straddle said plate.

4. The combination, with a tubular metallic strut and a metallic aeroplane plane sustaining surface, of means for connecting said strut and said surface, including an angular step member extending into said strut and connected with said strut and the surface by a lap joint, said lap joint including a folded portion of said surface.

5. The combination, with a tubular metallic strut and a metallic aeroplane sustaining surface, of means for connecting said strut and said surface, including an angular step member extending into said strut and connected with said strut and the surface by a lap joint, said lap joint including a folded portion of said surface, and a separate metallic sheet bridging the space beneath said step member and strut, and being disposed in the plane of said sustaining surface.

6. The combination, with a tubular metallic strut and a metallic aeroplane sustaining surface, of means for connecting said strut and said surface, including an angular step member extending into said strut and connected with said strut and the surface by a lap joint, and a separate metallic sheet bridging the space beneath said step member and strut and being disposed in the plane of said sustaining surface; the edges of said last named member being folded and incorporated with the lap joint.

7. In improvements of the character disclosed, a metallic sustaining or plane surface, a hollow metallic strut, and means for connecting said strut with the plane surface, including a seat member secured to said plane surface and being received within said hollow strut which is split to straddle the same.

8. In improvements of the character disclosed, a strut formed of sheet material and bent so that the upright edges of same are joined together, a portion of one end of said strut being split whereby divergent leaves are provided and a plane surface to which said divergent leaves are connected.

In testimony whereof I have signed my name to this specification in the presence of two subscribing witnesses.

HARRIS G. HOOPER.

Witnesses:
RAYMOND IVES BLAKESLEE,
WILLIS S. MITCHELL.